United States Patent
Cheng et al.

(10) Patent No.: US 7,548,209 B2
(45) Date of Patent: Jun. 16, 2009

(54) PORTABLE WIRELESS COMMUNICATION APPARATUS

(75) Inventors: Chia Hua Cheng, Taipei (TW); Chin Hsing Yen, Taipei (TW); Kun Ho Yang, Taipei (TW)

(73) Assignees: Giga-Byte Communications Inc., Taipei (TW); Giga-Byte Technology Co., Ltd., Taipei (TW)

( * ) Notice: Subject to any disclaimer, the term of this patent is extended or adjusted under 35 U.S.C. 154(b) by 12 days.

(21) Appl. No.: 11/898,682

(22) Filed: Sep. 14, 2007

(65) Prior Publication Data

US 2009/0073057 A1 Mar. 19, 2009

(51) Int. Cl.
*H01Q 1/24* (2006.01)
(52) U.S. Cl. ..................................... 343/702
(58) Field of Classification Search ............ 343/702
See application file for complete search history.

(56) References Cited

U.S. PATENT DOCUMENTS

| | | | |
|---|---|---|---|
| 5,739,793 A | 4/1998 | Adachi | |
| 5,949,377 A | 9/1999 | Matsumoto et al. | |
| 6,262,684 B1 | 7/2001 | Stewert et al. | |
| 6,275,193 B1 | 8/2001 | Nilsen et al. | |
| 6,353,414 B1 | 3/2002 | Jones et al. | |
| 6,480,159 B1 | 11/2002 | Hsu | |
| 2007/0024507 A1* | 2/2007 | Kasamatsu et al. | 343/702 |
| 2008/0094292 A1* | 4/2008 | Su | 343/702 |

FOREIGN PATENT DOCUMENTS

| | | |
|---|---|---|
| TW | M296489 | 8/2006 |
| TW | M304787 | 1/2007 |
| TW | M307802 | 3/2007 |

* cited by examiner

*Primary Examiner*—Rexford Barnie
*Assistant Examiner*—Thienvu V Tran
(74) *Attorney, Agent, or Firm*—Rosenberg, Klein & Lee

(57) ABSTRACT

A portable wireless communication apparatus includes a body and a pen/antenna device. The body includes a circuit board disposed therein, a recess defined therein, a conductive resilient element disposed in the recess and connected to the circuit board and a touch panel provided on the body. The pen/antenna device includes a pen for use on the touch pane to control the portable wireless communication apparatus and a telescopic antenna connected to the pen. The telescopic antenna is connected to the circuit board through the conductive resilient element when a portion of the telescopic antenna is disposed in the recess.

3 Claims, 5 Drawing Sheets

PORTABLE WIRELESS COMMUNICATION APPARATUS

BACKGROUND OF INVENTION

1. Field of Invention

The present invention relates to a portable wireless communication apparatus and, more particularly, to a portable wireless communication apparatus equipped with a pen/antenna device.

2. Related Prior Art

Portable wireless communication apparatuses are made more and more powerful regarding function, but smaller and smaller in size and lighter and lighter in weight. However, antennas are the longer the better for receiving television signals. A built-in antenna causes a portable wireless communication apparatus to be big. An external antenna however causes inconvenience in carrying and storage.

According to Taiwanese Patent M296489, a pen/antenna device includes a pen, an antenna and a connector. The antenna is telescopic. The connector includes an end connected to the pen and another end connected to antenna. Through engagement of threads with each other, the pen/antenna device is connected to an electronic device for wireless communication. It is however inconvenient to connect the pen/antenna device to the electronic device, and vice versa.

According to Taiwanese Patent M307802, a portable communication apparatus includes a pen/antenna device, a signal-connecting socket and a recess. The pen/antenna device is telescopic. On one hand, the pen/antenna device can be used on a touch panel to control the portable communication apparatus. On the other hand, the pen/antenna device can be inserted in the signal-connecting socket to receive signals. It is however inconvenient to remove the pen/antenna device from the recess and insert it into the signal-connecting socket before use.

According to Taiwanese Patent M304787, a telescopic antenna can be extended, bent and rotated to obtain the best quality of signals. The telescopic antenna cannot however be used as a pen since it is secured to an electronic device.

According to U.S. Pat. No. 6,353,414, a portable information device includes a body, a circuit board disposed in the body, a recess defined in the body, a conductive resilient element disposed in the recess and connected to a circuit board and a pen/antenna device. When the pen/antenna device is inserted in the recess, the pen/antenna device is connected to the circuit board via the conductive resilient element. The pen/antenna device is however unable to receive television signals such as VHF and UHF signals because of its limited length.

The present invention is therefore intended to obviate or at least alleviate the problems encountered in prior art.

SUMMARY OF INVENTION

According to the present invention, a portable wireless communication apparatus includes a body and a pen/antenna device. The body includes a circuit board disposed therein, a recess defined therein, a conductive resilient element disposed in the recess and connected to the circuit board and a touch panel provided on the body. The pen/antenna device includes a pen for use on the touch panel to control the portable wireless communication apparatus and a telescopic antenna connected to the pen. The telescopic antenna is connected to the circuit board through the conductive resilient element when a portion of the telescopic antenna is disposed in the recess.

The primary advantage of the portable wireless communication apparatus according to the present invention is good quality of signals in use and convenience in storage.

Other advantages, objectives and features of the present invention will become apparent from the following description referring to the attached drawings.

BRIEF DESCRIPTION OF DRAWINGS

The present invention will be described via detailed illustration of two embodiments referring to the drawings wherein.

DETAILED DESCRIPTION OF EMBODIMENTS

Figure 1:
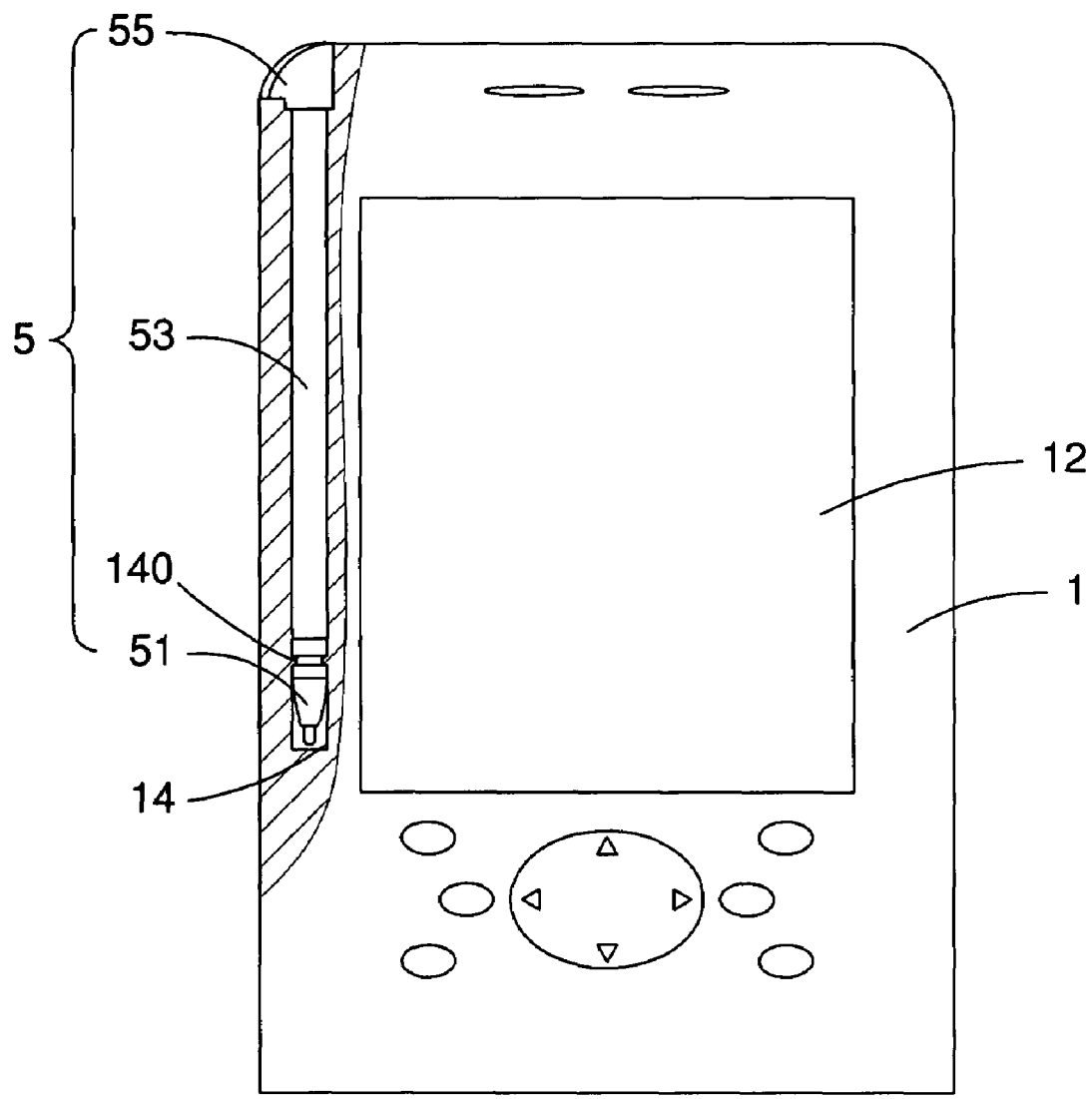
FIG. 1 is a front view of a portable wireless communication apparatus equipped with a pen/antenna device according to the first embodiment of the present invention.
Figure 2:
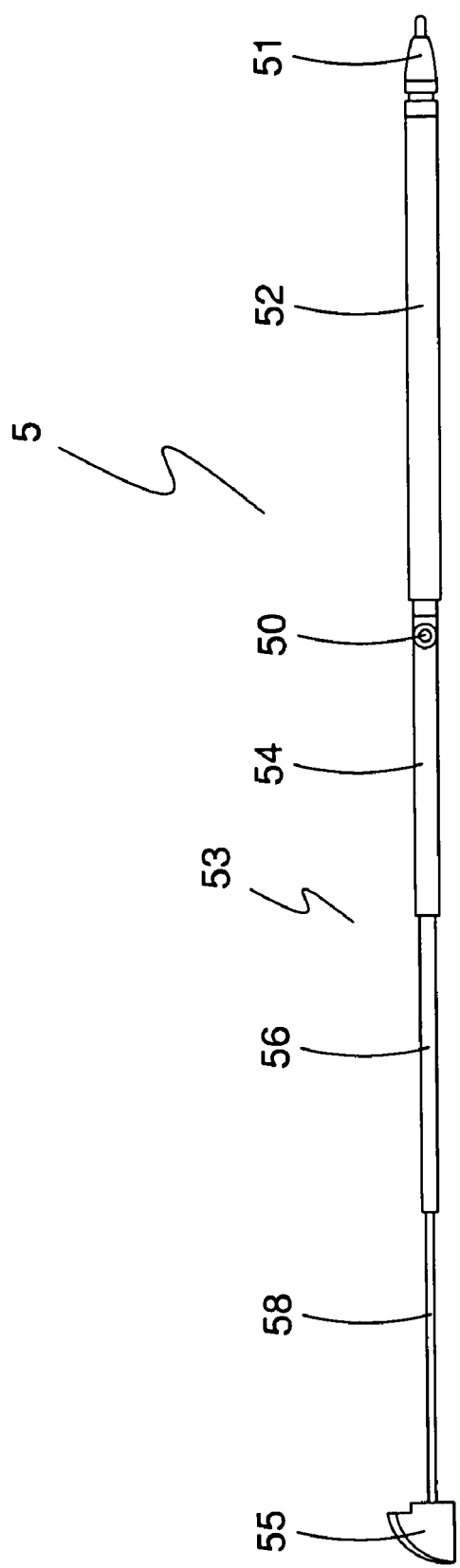
FIG. 2 is a front view of an pen/antenna device used in the portable wireless communication apparatus shown in FIG. 1, but showing the pen/antenna device extended and inverted.
Figure 3:
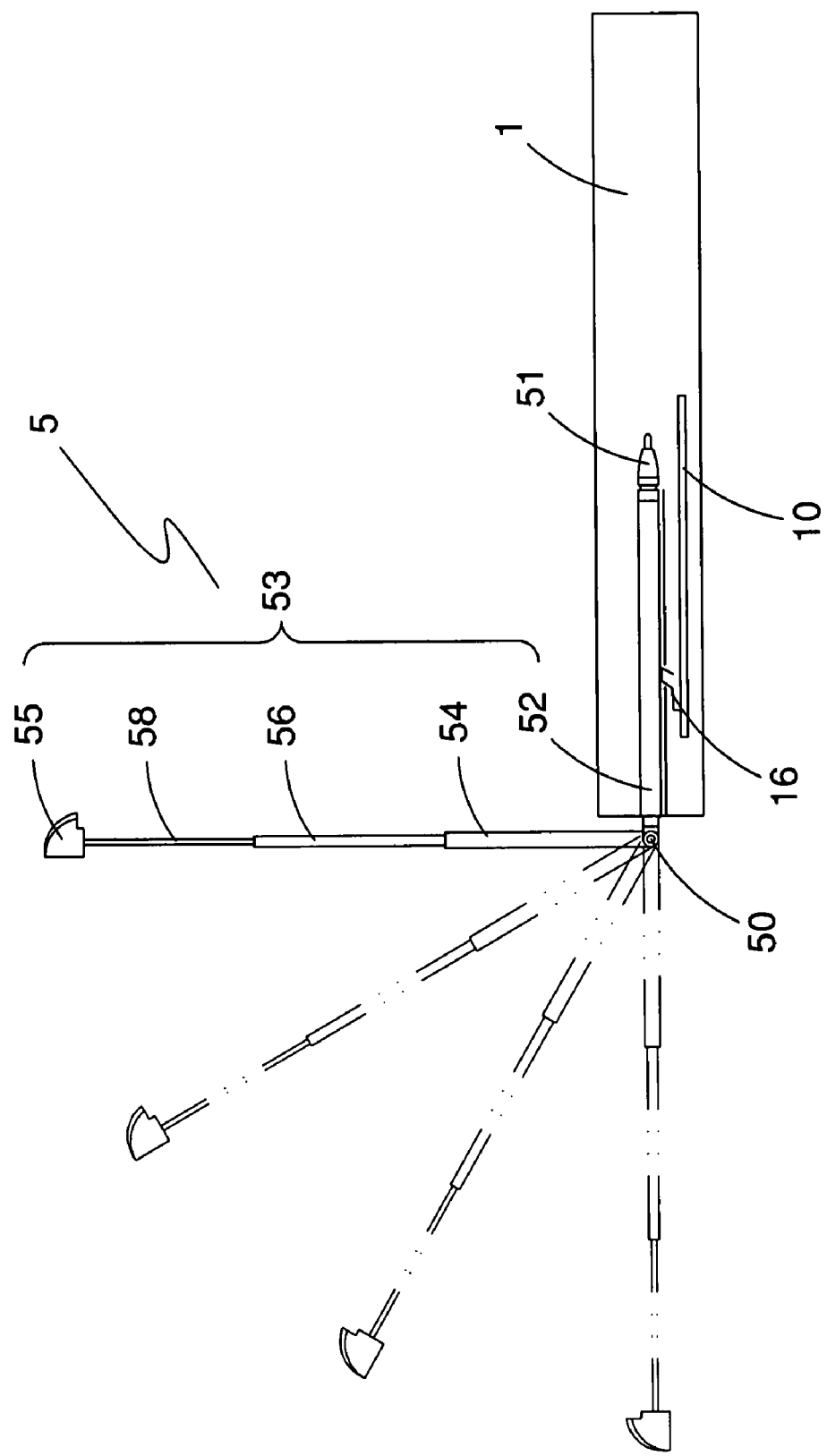
FIG. 3 is a left side view of the portable wireless communication apparatus shown in FIG. 1.

Referring to FIGS. 1 through 3, a portable wireless communication apparatus includes a body 1 and a pen/antenna device 5 according to a first embodiment of the present invention. The body 1 includes a circuit board 10 disposed therein, a display 12 provided thereon and a recess 14 defined therein. The circuit board 10 includes a wireless communication unit. The circuit board 10 may include other units used as a personal digital assistant and a GPS device for example. The display 12 is preferably a touch panel.

The body 1 includes a recess 14 defined therein for receiving the pen/antenna device 5. To this end, the shape of the recess 14 is in compliance with that of the pen/antenna device 5. A boss 140 is formed on the wall of the recess 14 for abutting and therefore retaining the pen/antenna device 5 in the recess 14.

A conductive resilient element 16 is disposed in the recess 14. The conductive resilient element 16 is connected to the wireless communication unit of the circuit board 10. The conductive resilient element 16 is used for contact with the antenna/pen device 5 in the recess 14. The conductive resilient element 16 may be a metal leaf spring.

The pen/antenna device includes a pen 51 and an antenna 53 connected to the pen 51. The pen 51 is used to contact the display 12, thus operating the portable wireless communication apparatus 1. The pen 51 is made of plastic or metal.

The antenna 53 is a telescopic element including four conductive tubes 52, 54, 56 and 58 and a universal joint 50. The first conductive tube 52 is connected to the pen 51. The universal joint 50 can be inserted in the first tube 52. The second conductive tube 54 is connected to the universal joint 50. The second conductive tube 54 can be inserted in the first tube 52. The third conductive tube 56 can be inserted in the second conductive tube 54. The fourth conductive tube 58 can be inserted in the third conductive tube 56.

An end element 55 connected to the fifth conductive tube 58. The end element 55 is shaped corresponding to a corner of the body 10 so that the profile of the entire portable wireless communication apparatus is smooth and aesthetically pleasant.

Due to the telescopic insertion, the antenna 53 can be reduced to a shortest length when not in use. In the shortest length, the antenna 53 can entirely be disposed in the recess 14. The end element 55 can be disposed in the recess 14. Thus, the portable wireless communication apparatus can easily be stored and carried.

The antenna 53 can be extended to a longest length for use. In the longest length, the antenna 53 is able to receive VHF and UHF signals.

Referring to FIG. 3 for the use of the universal joint 50, the second conductive tube 54, the third conductive tube 56 and the fourth conductive tube 58 can be pivoted about an axis to any desired angle in a range smaller than 360 degrees relative to the first conductive tube 52.

Figure 4:
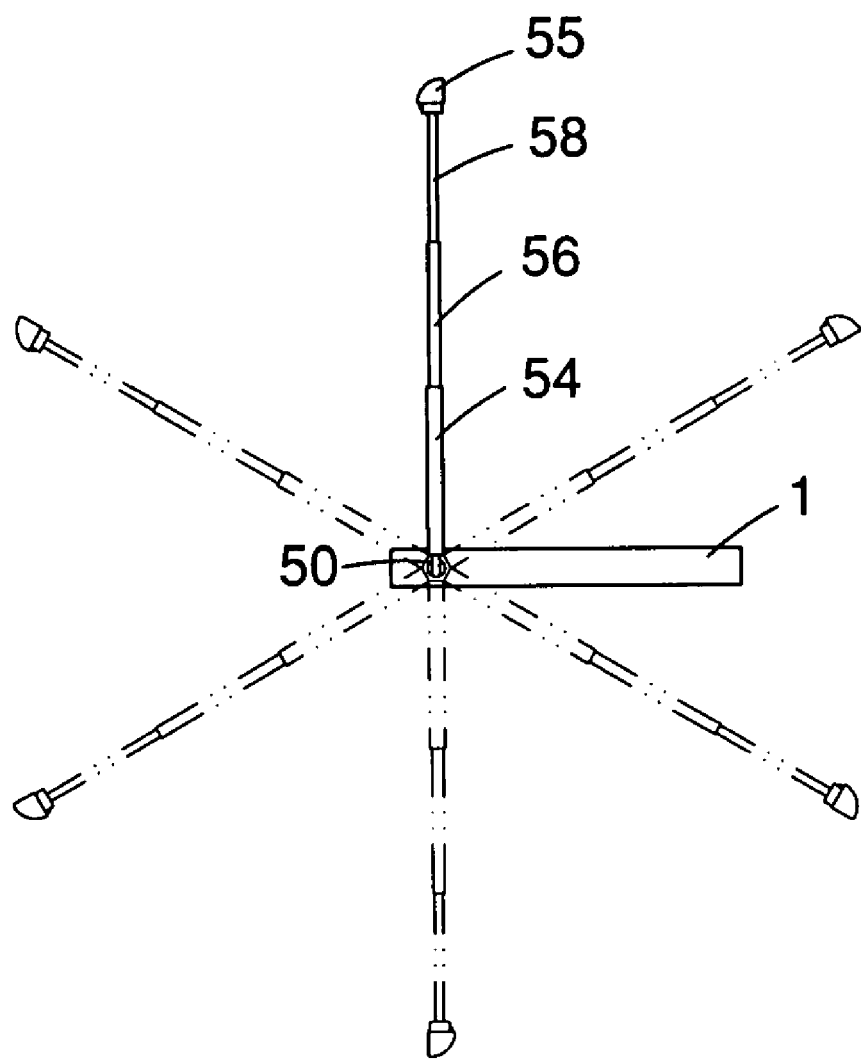
FIG. 4 is a reduced view of the portable wireless communication apparatus shown in FIG. 3.

Referring to FIG. 4, the entire pen/antenna device can be rotated about another axis to any desired angle in a range of 360 degrees. Thus, the best quality of signals can be obtained.

Figure 5:
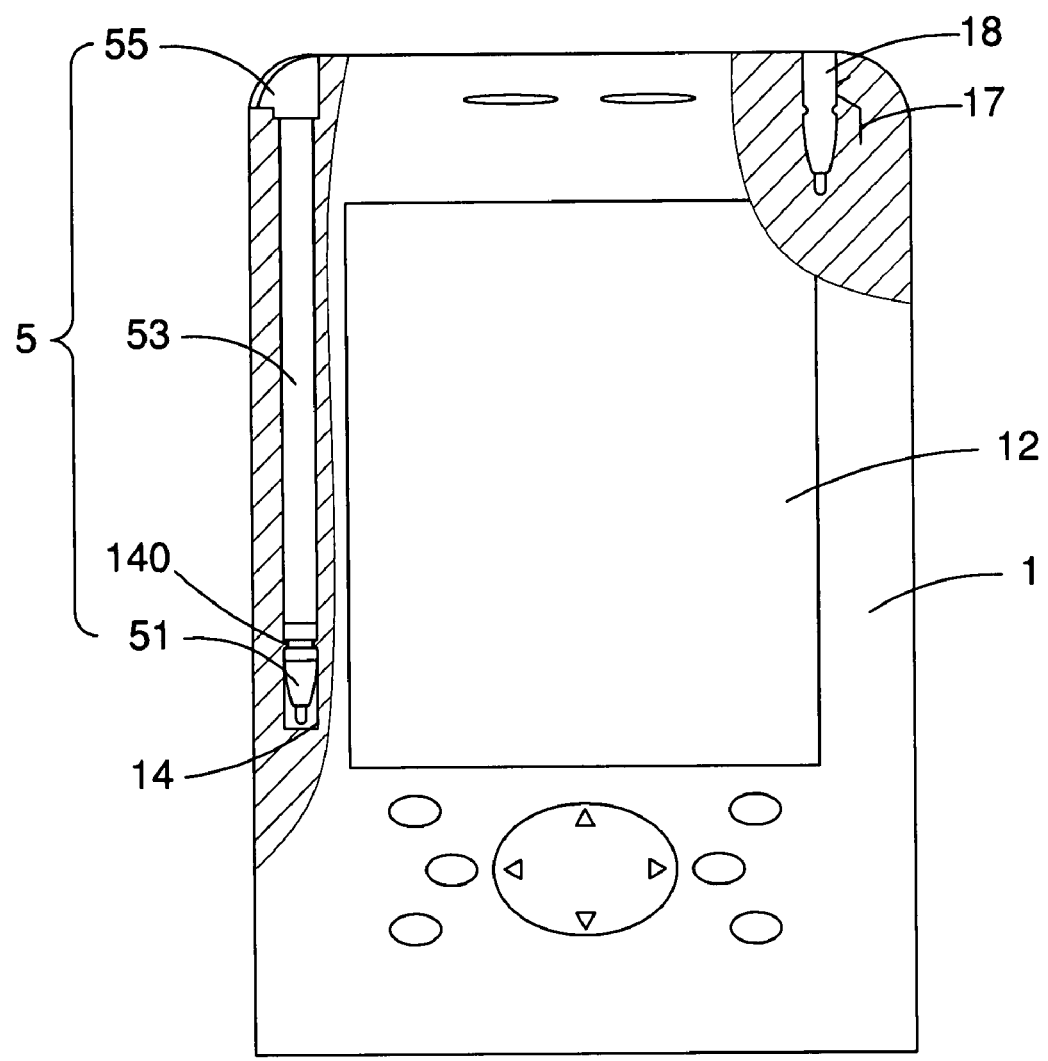
FIG. 5 is a front view of a portable wireless communication apparatus according to the second embodiment of the present invention.

Referring to FIG. 5, there is shown a portable wireless communication apparatus according to a second embodiment of the present invention that is identical to the first embodiment except including another recess 18 defined in the body 10 and another conductive resilient element 17 disposed in the recess 18 and connected to the circuit board 10.

The pen 51 and the first conductive tube 52 can be disposed in the recess 14 so that the first conductive tube 52 is in contact with the conductive resilient element 16. Alternatively, the pen 51 and a portion of the first conductive tube 52 can be disposed in the recess 18 so that the first conductive tube 52 is in contact with the conductive resilient element 17. When portable wireless communication apparatus is held upright, a higher point and therefore a better quality of signals can be reached by the pen/antenna device 5 in contact with the conductive resilient element 17 than in contact with the conductive resilient element 16.

The present invention has been described via the detailed illustration of the embodiments. Those skilled in the art can derive variations from the embodiments without departing from the scope of the present invention. Therefore, the embodiments shall not limit the scope of the present invention defined in the claims.

The invention claimed is:

1. A portable wireless communication apparatus comprising:
   a body comprising a circuit board disposed therein, a first recess defined therein, a first conductive resilient element disposed in the first recess and connected to the circuit board and a touch panel provided on the body; and
   a pen/antenna device comprising a pen for use on the touch panel to control the portable wireless communication apparatus and a telescopic antenna connected to the pen; the telescopic antenna being connected to the circuit board through the first conductive resilient element when the telescopic antenna is disposed in the first recess and including a first conductive tube connected to the pen, a joint telescopically inserted in the first conductive tube and a second conductive tube connected to the joint; and the joint enabling the first and second conductive tubes to be rotated relative to each other about two axes;
   wherein the first recess of the body is shaped in compliance with the pen/antenna device so as to entirely receive the pen/antenna when the telescopic antenna of the pen/antenna is reduced to a shortest length and inserted into the first recess.

2. The portable wireless communication apparatus according to claim 1 wherein the telescopic antenna is extensible to a sufficient length for receiving television signals.

3. The portable wireless communication apparatus according to claim 1 wherein the body comprises a second recess defined therein, a second conductive resilient element disposed in the second recess and connected to the circuit board so that the telescopic antenna is connected to the circuit board through a selected one of the first and second conductive resilient elements when a portion of the telescopic antenna is disposed in a related one of the first and second recesses.

* * * * *